(12) United States Patent
Ueno et al.

(10) Patent No.: US 6,927,875 B2
(45) Date of Patent: Aug. 9, 2005

(54) PRINTING SYSTEM AND PRINTING METHOD

(75) Inventors: Hiroshi Ueno, Ibaraki (JP); Shuho Yokokawa, Ibaraki (JP); Isao Nakajima, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 913 days.

(21) Appl. No.: 09/801,780

(22) Filed: Mar. 9, 2001

(65) Prior Publication Data

US 2001/0021027 A1 Sep. 13, 2001

(30) Foreign Application Priority Data

Mar. 10, 2000 (JP) .................................... P2000-065819
Oct. 27, 2000 (JP) .................................... P2000-328699

(51) Int. Cl.[7] ............................ G06F 3/12; G06F 13/00
(52) U.S. Cl. ...................... 358/1.18; 358/1.8; 358/1.12
(58) Field of Search ............................... 358/1.1–1.18, 358/6, 16, 44, 66–74, 136, 148; 270/12–17, 30.11, 30.13; 271/3.04, 3.06, 3.09, 3.13, 3.17, 3.18, 4.01, 4.02, 4.03, 9.02

(56) References Cited

FOREIGN PATENT DOCUMENTS

| DE | 3626819 C2 | 8/1989 |
| DE | 3937356 A1 | 5/1990 |
| DE | 195 28 757 A1 | 2/1996 |
| EP | 0 469 282 A2 | 2/1992 |

Primary Examiner—Douglas Tran
(74) Attorney, Agent, or Firm—Sughrue Mion, PLLC

(57) ABSTRACT

In a printing system including first image forming means (A) for forming a first image on a recording medium (7) based on first image information, fixing means (13, 14 and 15) for subjecting the recording medium bearing the first image thereon to at least heating operation so as to fix the first image onto the recording medium, and second image forming means (B) for forming a second image on the recording medium, which has passed through the fixing means, based on second image information, there is provided correcting means for correcting the second image information based on a quantity of heat shrinkage of the recording medium generated by the heating operation in the fixing means.

5 Claims, 4 Drawing Sheets

PRINTING SYSTEM AND PRINTING METHOD

BACKGROUND OF THE INVENTION

1. Field of the Invention

The present invention relates to a printing system and a printing method.

2. Description of the Related Art

There has been known a printing system disclosed in, for example, Japanese Patent Application Laid-open No. 321062/1992, in which a sheet reversing device is interposed between printers disposed adjacent to each other, a toner image is fixed to one surface of a sheet by the printer located at a front stage with respect to the sheet reversing device, the fed sheet is reversed by the sheet reversing device, the sheet is fed to the printer located at a rear stage with respect to the sheet reversing device, the toner image is fixed to the other surface of the sheet, and thus, the toner images are formed at both surfaces of the sheet (the above-described mode of the printing system will be hereinafter referred to as "a tandem printing system" for the sake of convenience).

In the tandem printing system as described above, when the toner image is fixed to the recording medium in the printer at the front stage, there has arisen a problem of heat shrinkage of the recording medium by heating operation of the fixing device. Consequently, when a finally obtained printout having images on both sides thereof is seen through, a region printed by the printer at the front stage cannot completely overlap with a region printed by the printer at the rear stage. In the case where double-sided printing is performed with respect to a thin sheet for use in, e.g., a dictionary, there may be caused inconvenience of formation of a printout of bad appearance in which intervals between characters or lines cannot completely overlap with each other at first and second surfaces.

Furthermore, in one of printing systems of this type, in order to achieve high-speed and large-volume printing, a sheet having, e.g., a width of 18 in. (a length in a direction perpendicular to a sheet feeding direction) and a length of 11 in. (a length in the sheet feeding direction) is used as the recording medium, an image on a first page and an image on a second page are arranged on the sheet in the sheet width direction, and finally, the sheet is cut into two sheets of a letter or A4 size, thus obtaining two pieces of printouts (like this example, printing the images of two pages in arrangement may be referred to as "2-up printing").

Also in the case where the above-described 2-up printing is performed in combination with the above-described tandem printing, the sheet is shrunk by about 2 mm in the width direction and by about 1 mm in the length direction in the fixing process in the printer at the front stage, thereby arising a problem that a printing position by the printer at the rear stage cannot completely overlap with a printing position by the printer at the front stage, as described above.

Incidentally, the above-described problems are not peculiar only to the above-described tandem printing system, and they are liable to arise also in the configuration in which no sheet reversing device is interposed between the two printers.

SUMMARY OF THE INVENTION

An object of the present invention is to provide a printing system and a printing method capable of printing a second image on a recording medium having a thermally fixed first image thereon with high positional accuracy.

The above-described object can be achieved by a printing system including first image forming means for forming a first image on a recording medium based on first image information, fixing means for subjecting the recording medium bearing the first image thereon to at least heating operation so as to fix the first image onto the recording medium, and second image forming means for forming a second image on the recording medium, which has passed through the fixing means, based on second image information, wherein the printing system comprises correcting means for correcting the second image information based on a quantity of heat shrinkage of the recording medium generated by the heating operation in the fixing means.

DETAILED DESCRIPTION OF THE PREFERRED EMBODIMENTS

Figure 1:
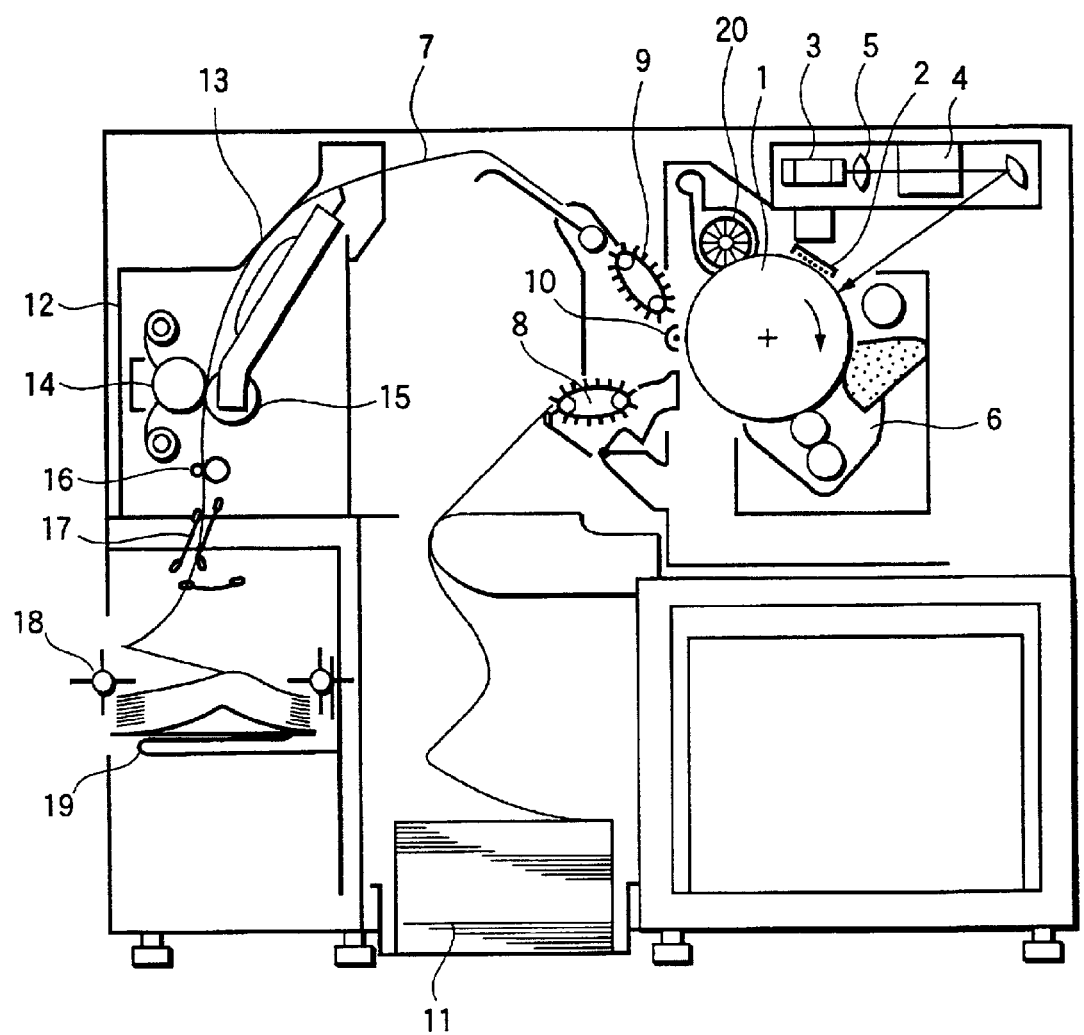
FIG. 1 is a general view showing the configuration of a printer.

A description will be given of a preferred embodiment according to the present invention in reference to the attached drawings. First, the entire configuration of a printer will be explained in reference to FIG. 1. In FIG. 1, reference numeral 1 designates a photosensitive drum. The photosensitive drum 1 is started to be rotated in response to a printing operation starting signal output from a controller, and further, is rotated at a speed equivalent to a printing speed of the printer until a printing operation is finished. When the photosensitive drum 1 is started to be rotated, a high voltage is applied to a corona charger 2, so that the surface of the photosensitive drum 1 is uniformly charged with, for example, positive charges.

Immediately after a power source is turned on in an electrophotographic apparatus, a rotary polyhedral mirror 3 is started to be rotated, and it is kept to be rotated at a constant speed with high accuracy during the turning-on of the power source. A laser beam emitted from a light source 4 composed of a semiconductor laser or a gas laser is reflected on the rotary polyhedral mirror 3, and then, the laser beam passes through an fθ lens 5. Consequently, the photosensitive drum 1 is irradiated with the laser beam while being scanned.

When character data or graphical data which has been converted into a dot image is transmitted as a laser beam on/off signal from the controller to the printer, a portion irradiated with the laser beam and a portion not irradiated with the laser beam are formed at the surface of the photosensitive drum 1. When the portion at which the charges on the photosensitive drum 1 are dissipated by the irradiation with the laser beam reaches a position facing a developing device 6, positively charged toners are attracted by static electricity, and consequently, a toner image is formed on the photosensitive drum 1. A sheet 7 is fed by means of tractors 8 and 9 in synchronism with a timing at which print data formed on the photosensitive drum 1 reaches a transfer position. The toner image formed on the photosensitive drum 1 is attracted onto the sheet 7 by operation of a transferring device 10 for applying, to the back surface of the sheet 7, electric charges having a polarity reverse to that of the toner image.

In this way, the sheet 7 stacked in a sheet hopper 11 is fed to a fixing device 12 via the tractor 8, the transferring device 10 and the tractor 9. After the sheet 7 reaches the fixing device 12, it is pre-heated by a pre-heater 13. Thereafter, the sheet 7 is held and fed while it is heated and pressurized at a nip portion defined by a pair of fixing rolls constituted of a heating roll 14 and a pressure roll 15, so that the toner image is fused and fixed onto the sheet 7. The sheet 7 fed by the heating roll 14 and the pressure roll 15 is fed toward a stacker table 19 by sheet feeding rolls 16, and further, the sheet 7 is alternately folded along perforations by the oscillation of swing fins 17. Moreover, the sheet 7 is stacked on the stacker table 19 while its folded state is adjusted by rotating paddles 18. In the meanwhile, the region of the photosensitive drum 1 passing through the transfer position is cleaned by a cleaner 20, and thereafter, it stands by for a next printing operation.

Figure 2:
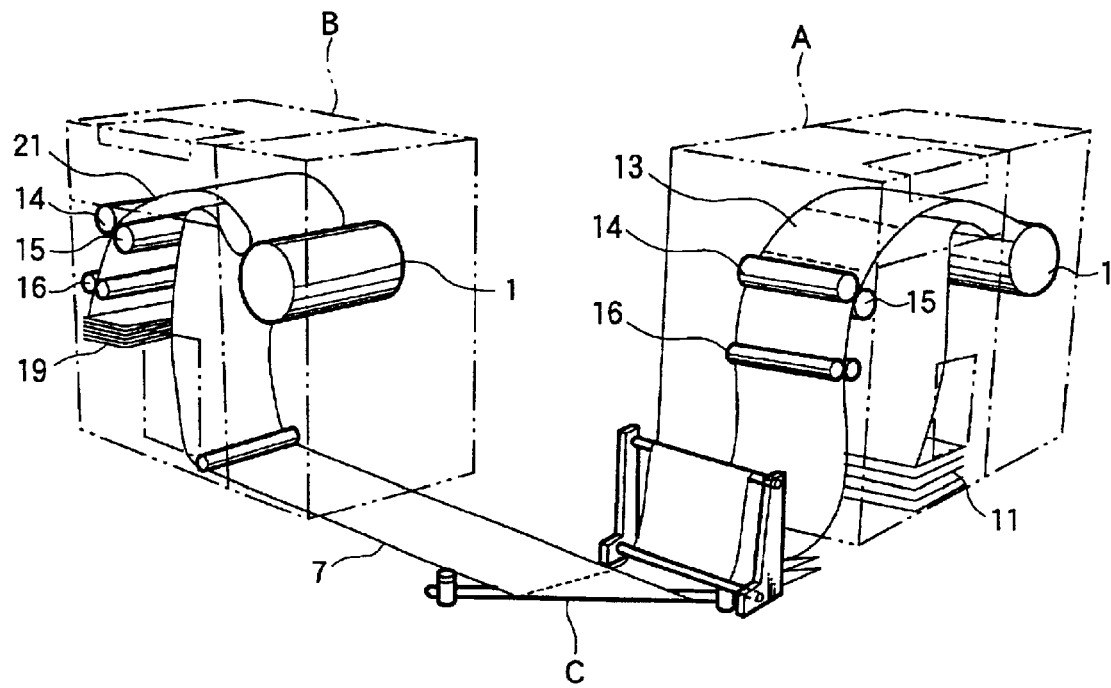
FIG. 2 is a schematic view showing one example of a printing system.

In the case where the printer illustrated in FIG. 1 is used as the above-described tandem printing system, another one is additionally installed as illustrated in FIG. 2. With this installation, the sheet 7 fed from a printer A at a front stage is turned upside down by a sheet reversing device C, and thereafter, is fed to an electrophotographic apparatus B at a rear stage, in which a toner image is formed also at the reverse of the sheet 7. In this case, the toner image fixed in the electrophotographic apparatus A at the front stage is formed at one surface of the sheet 7 facing to a pre-heater 21 in the electrophotographic apparatus B at the rear stage while the other toner image fixed in the electrophotographic apparatus B at the rear stage is formed at the other surface of the sheet 7. Here, since the temperature of the pre-heater 21 is changed to become the glass transition point of the toner or lower, it is possible to prevent the toner image fixed in the electrophotographic apparatus A at the front stage from being softened again.

In the case where double-sided printing is performed in the above-described tandem printing system, the sheet 7 serving as a recording medium is thermally shrunk under the fixing heat in the electrophotographic apparatus A, thereby arising a problem of misalignment between the printing position at the obverse and the printing position at the reverse, as described above. In view of this, in the present embodiment, a quantity of heat shrinkage of a sheet has been previously obtained by experiments based on the size and thickness of a sheet to be used and the fixing temperatures of the heating roll 14 and the pre-heater 21, and the resultant data has been stored in a storage inside a controller (not shown).

The above-described data is used as data for controlling an image exposing/writing timing or a writing speed of a light source 4 with respect to a photosensitive drum 1 in the electrophotographic apparatus B at the rear stage. The above-described data may be selected based on a signal which is transmitted by automatic recognition of the electrophotographic apparatus A when an operator loads sheets in the electrophotographic apparatus A, or based on a signal which is transmitted when an operator inputs information on the sheet loaded in the electrophotographic apparatus A.

Figure 3:
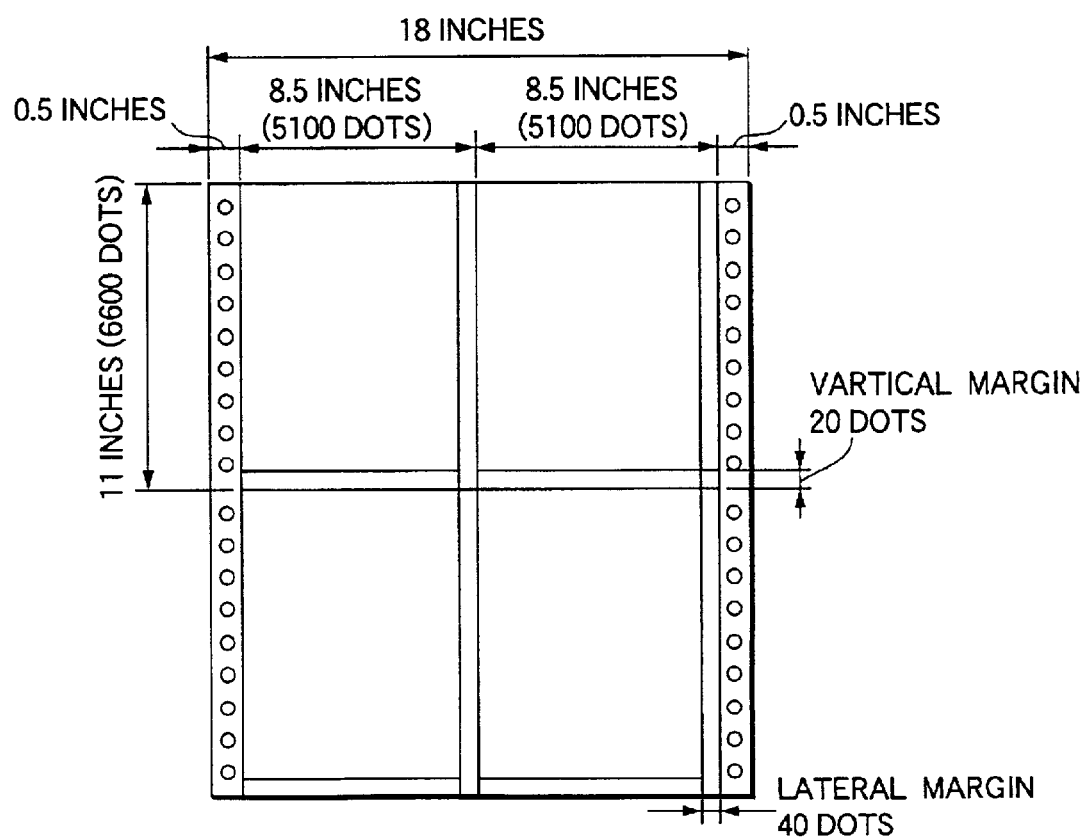
FIG. 3 conceptually illustrates a page in the case where 2-up printing is performed.

FIG. 3 conceptually illustrates a page in the case where the 2-up printing is performed with respect to a sheet having a width of 18 inches and a length of 11 inches.

Upon completion of the printing operation, the sheet having a width of 18 in. and a length of 11 in. is cut at the center and at positions apart by 0.5 inches from both edges at which punches have been formed, into two printouts of 8.5 inches×11 inches, thereby obtaining a printing information in which two pages of 8.5 inches×11 inches are arranged.

In the case where the resolution of exposure by the printer is 600 dpi (dot/inch), the page of 8.5 inches×11 inches is equivalent to a page of 5100 dots in a lateral direction and 6600 dots in a vertical direction. However, according to the present invention, a page is composed of 5060 dots in the lateral direction and 6580 dots in the vertical direction with margins of 40 dots (about 1.7 mm) in the lateral direction and 20 dots (about 0.8 mm) in the vertical direction. Therefore, although the printing operation is performed in the first printer without increasing or decreasing the margins, the printing operation is performed in the second printer by decreasing 20 dots in the lateral direction in the case of a punched sheet while by decreasing 20 dots in the lateral direction and 10 dots in the vertical direction in the case of a not-punched sheet in consideration of the heat shrinkage of the sheet caused by the fixing operation in the first printer. Although the margins are defined within the page in the above-described embodiment, the same effect can be produced even if the margins are defined outside of the page.

The above description has been given on the assumption that the printing system is constituted of the two printers. However, the present invention is not limited to the above-described embodiment. For example, a printer may be configured such that even if there appears only one printer as viewed from the outside, two printing stations are provided inside of the printer, and further, that a fixing device is interposed between the two printing stations, as shown in FIGS. 4 to 7.

Figure 4:
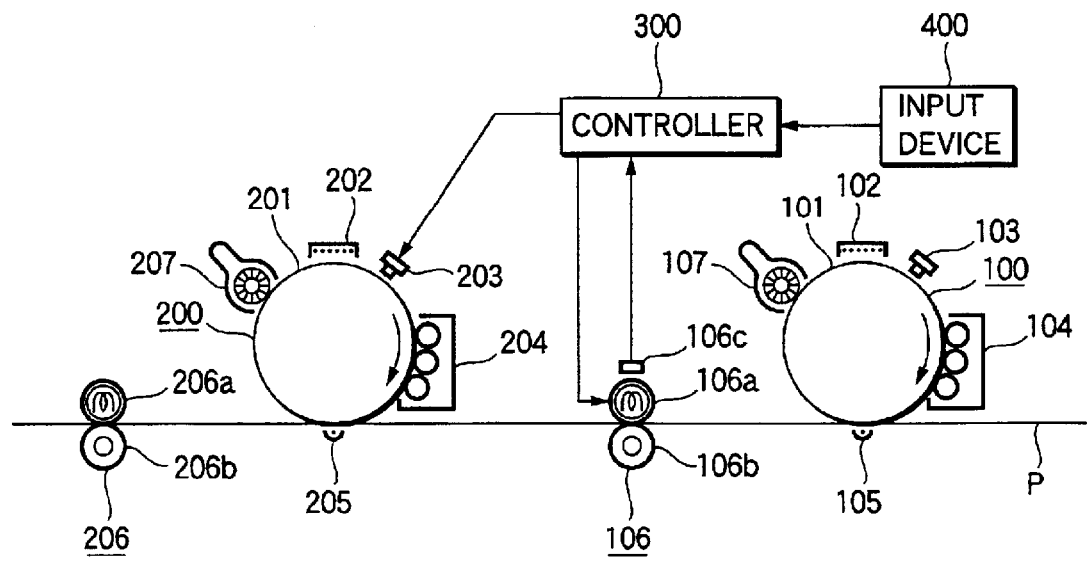
FIG. 4 is a schematic view showing another embodiment according to the present invention.

Explanation will be made below on the configurations shown in FIGS. 4 to 7. In FIG. 4, reference numeral 100 designates a printing station at a front stage; and 200 denotes a printing station at a rear stage. Furthermore, reference numeral 101 designates a photosensitive drum. The photosensitive drum 101 is started to be rotated in response to a printing operation starting signal output from a controller 300. When the photosensitive drum 101 is started to be rotated, a high voltage is applied to a corona charger 102, so that the surface of the photosensitive drum 101 is uniformly charged with, for example, positive charges. The photosensitive drum 101 is irradiated with light emitted from a light source 103 composed of an LED array, thereby recording and forming a statistic latent image on the photosensitive drum 101. When a region of the statistic latent image formed on the photosensitive drum 101 reaches a position facing a developing device 104, positively charged toners are attracted by static electricity, and consequently, a toner image is formed on the photosensitive drum 101. The toner image formed on the photosensitive drum 101 is attracted onto a sheet P by operation of a transferring device 105 for applying, to the back surface of the sheet P, electric charges having a polarity reverse to that of the toner image. Thus, a first image is formed on the sheet P.

After the sheet P reaches a fixing device 106, the sheet P is held and fed while it is heated and pressurized at a nip portion defined by a pair of fixing rolls constituted of, for example, a heating roll 106a and a pressure roll 106b, so that the toner image is fused and fixed onto the sheet P.

A second image is formed on the sheet P fed by the heating roll 106a and the pressure roll 106b in the printing station 200 at the rear stage.

In the other printing station 200, a photosensitive drum 201 is started to be rotated in response to a printing operation starting signal output from the controller 300. When the photosensitive drum 201 is started to be rotated, a high voltage is applied to a corona charger 202, so that the surface of the photosensitive drum 201 is uniformly charged with, for example, positive charges. The photosensitive drum 201 is irradiated with light emitted from a light source 203 composed of an LED array, thereby recording and forming a statistic latent image on the photosensitive drum 201.

Here, the image is exposed to the photosensitive drum 201 by the light source 203 after image data is corrected in consideration of heat shrinkage of the sheet caused by the heat function in the fixing device 106. In the present embodiment, a quantity of heat shrinkage of a sheet has been previously obtained by experiments based on the size and thickness of a sheet to be used and the fixing temperature of the heating roll 106a, and the resultant data has been stored in a storage (not shown) inside the controller 300. Optimum data is selected from the storage in response to a sheet information signal output from an input device 400, thus controlling a timing of light emission from the light source 203 to the photosensitive drum 201.

Incidentally, with respect to the input device 400, a sheet information signal may be automatically transmitted to the controller 300 by the printer which automatically recognizes sheet information (e.g., a size or volume) when, for example, an operator loads sheets in the printer; or an operator may manually input information on sheets which are loaded in the printer.

When a region of the statistic latent image formed on the photosensitive drum 201 reaches a position facing a developing device 204, positively charged toners are attracted by static electricity, and consequently, a toner image is formed on the photosensitive drum 201. The toner image formed on the photosensitive drum 201 is attracted onto the sheet P by operation of a transferring device 205 for applying, to the back surface of the sheet P, electric charges having a polarity reverse to that of the toner image. Thus, a second image is further formed on the sheet P having the first image already fixed thereon.

After the sheet P reaches a fixing device 206, the sheet P is held and fed while it is heated and pressurized at a nip portion defined by a pair of fixing rolls constituted of, for example, a heating roll 206a and a pressure roll 206b, so that the toner image is fused and fixed onto the sheet P, which is then discharged outward of the station.

In the meanwhile, the photosensitive drums 101 and 201 passing through the transfer positions are cleaned by cleaners 107 and 207, respectively, and then, they stand by for a next printing operation.

The surface temperature of the heating roll 106a is monitored by a temperature sensor 106c, an output from which is input into the controller 300 for performing a feedback control in such a manner as to keep a constant temperature.

Figure 5:
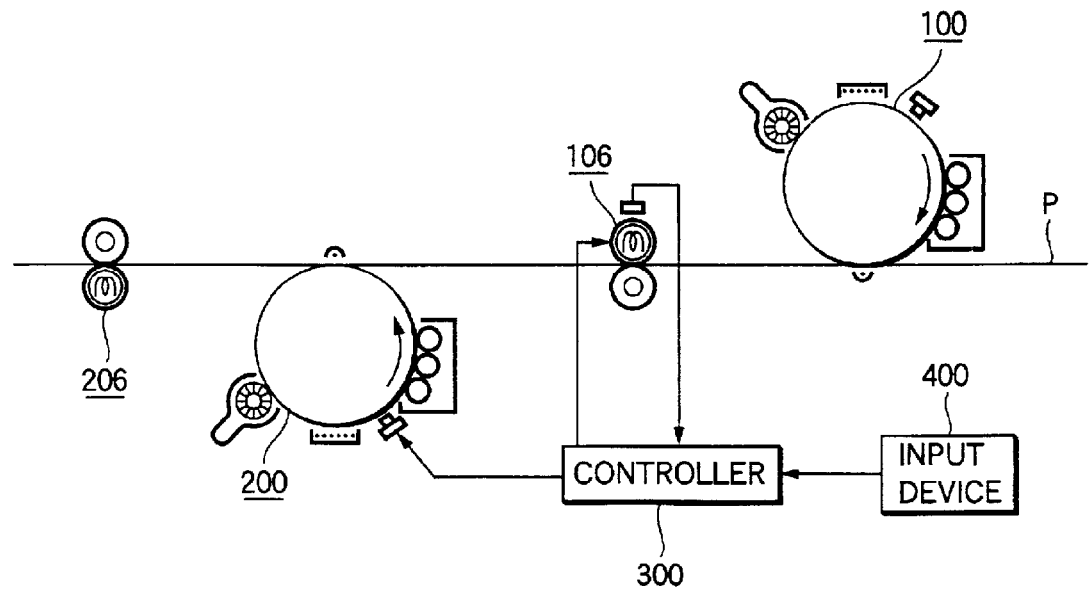
FIG. 5 is a schematic view showing a further embodiment according to the present invention.

Although the printing system for forming two kinds of toner images on the sheet P by the use of the printing stations 100 and 200 has been illustrated in FIG. 4, a printing system for performing a double-sided printing operation may be constituted such that a printing station 200 is located on the side of the reverse of the sheet P, as shown in FIG. 5.

Figure 6:
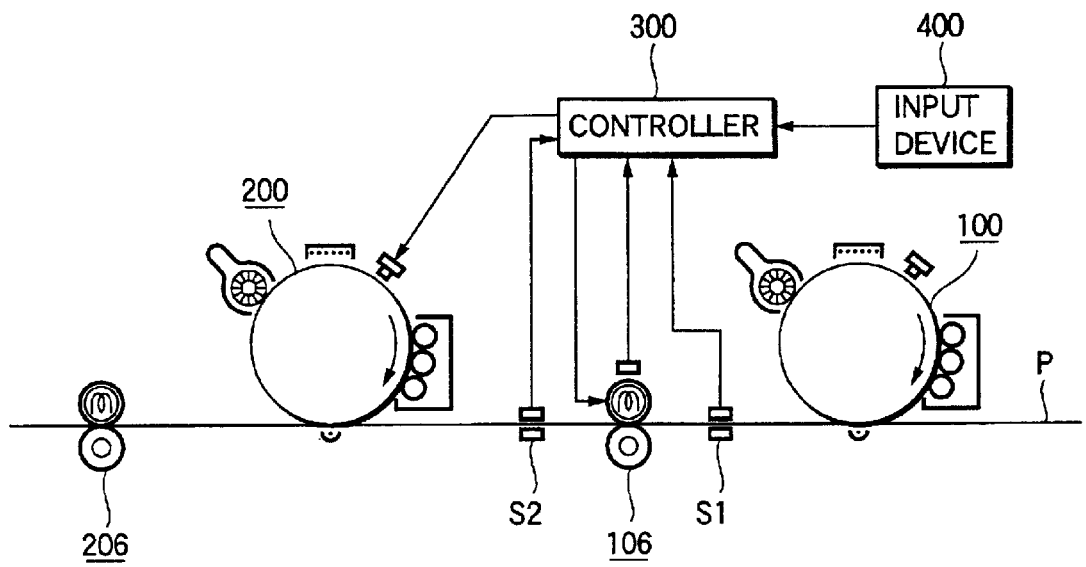
FIG. 6 is a schematic view showing a still further embodiment according to the present invention.
Figure 7:
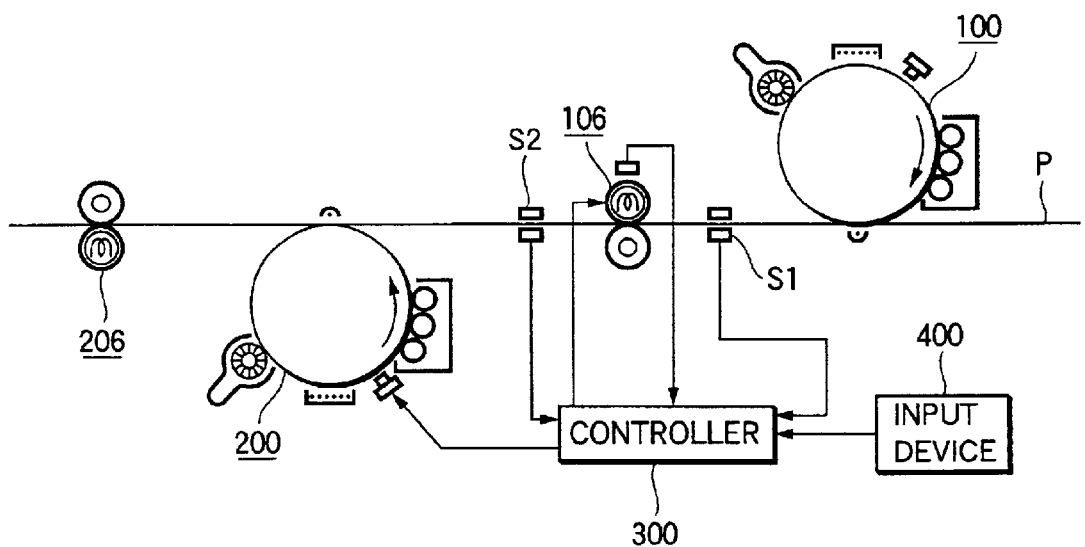
FIG. 7 is a schematic view showing a further embodiment according to the present invention.

Moreover, although the above descriptions have been given of the configurations in which the quantity of the heat shrinkage of the sheet has been previously obtained by experiments, sensors may be provided in front of and behind the fixing device 106, for directly calculating the quantity of the heat shrinkage of the fed sheet, as shown in FIGS. 6 and 7.

In such a case, with respect to the quantity of the heat shrinkage of the sheet in a width direction, sensors $S_1$ and $S_2$ detect the edges of the sheet P, thereby obtaining the quantity of the heat shrinkage based on a difference between a width of the sheet before the fixation, measured by the sensor $S_1$ and a width of the sheet after the fixation, measured by the sensor $S_2$. In the meantime, with respect to the quantity of the heat shrinkage in the sheet feeding direction, for example, positioning toner marks are printed on part of the sheet P at predetermined pitches in the printing station 100, and then, the sensors $S_1$ and $S_2$ detect the interval between the toner marks, thereby obtaining the quantity of the heat shrinkage based on a difference between a toner mark pitch before the fixation, detected by the sensor $S_1$ and a toner mark pitch after the fixation, detected by the sensor $S_2$. In the case where the sheet P is a punched sheet, such punches may be used in stead of the above-described toner mark.

The sensor for use in detecting the quantity of the heat shrinkage in the sheet width direction need not be integrated with the sensor for use in detecting the quantity of the heat shrinkage in the sheet feeding direction. It is needless to say that the sensors should be provided independently of each other, or they should be of types different from each other.

As described above, according to the present invention, the correcting device is provided for correcting the second image information based on the quantity of heat shrinkage of the recording medium generated by the heating operation in the fixing device, thus achieving the printing system and the printing method capable of printing the second image on the recording medium having the thermally fixed first image thereon with high positional accuracy.

What is claimed is:

1. A printing system comprising:

A first image forming section adapted to form a first image on a recording medium based on first image information;

a fixing section adapted to subject the recording medium bearing the first image thereon to at least heating operation so as to fix the first image onto the recording medium;

a second image forming section adapted to form a second image on the recording medium, which has passed through said fixing section, based on second image information; and a correcting section adapted to correct the second image information based on a quantity of heat shrinkage of the recording medium generated by the heating operation in the fixing section.

2. A printing system comprising:

a first printer having a first image forming section adapted to form a first image on a recording medium based on first image information and a fixing section adapted to subject the recording medium bearing the first image thereon to at least heating operation so as to fix the first image onto the recording medium; and a second printer having a second image forming section adapted to form a second image on the recording medium, which has been fed from the first printer, based on second image information;

a correcting section provided in at least the second printer, for correcting the second image information based on a quantity of heat shrinkage of the recording medium generated by the heating operation in the fixing section.

3. A printing method comprising:

a first image forming step of forming a first image on a recording medium based on first image information;

a fixing step of subjecting the recording medium bearing the first image thereon to at least heating operation so as to fix the first image onto the recording medium;

a second image forming step of forming a second image on the recording medium after the fixing step based on second image information; and an image information correcting step of correcting the second image information based on a quantity of heat shrinkage of the recording medium generated by the heating operation in the fixing step prior to the second image forming step.

4. A printing system comprising:

a first image forming section adapted to form a first image on a recording medium based on first image information;

a fixing section adaptd to subject the recording medium bearing the first image thereon to at least heating operation so as to fix the first image onto the recording medium; and a second image forming section adapted to form a second image on the recording medium, which has passed through the fixing means, based on second image information;

a first detecting section adapted to detect at least either one of the length and width of a page of the recording medium at a front stage of the fixing section;

a second detecting section adapted to detect at least either one of the length and width of the page of the recording medium at a rear stage of the fixing secttion; and a correcting section adapted to determine a quantity of heat shrinkage of the recording medium generated by the heating operation in the fixing section based on outputs from the first detecting section and the second detecting section so as to correct the second image information based on the quantity of heat shrinkage.

5. A printing method comprising:

a first image forming step of forming a first image on a recording medium based on first image information;

a fixing step of subjecting the recording medium bearing the first image thereon to at least heating operation so as to fix the first image onto the recording medium;

a second image forming step of forming a second image on the recording medium after the fixing step based on second image information;

a first detecting step of detecting at least either one of the length and width of a page of the recording medium at a front stage of the fixing step;

a second detecting step of detecting at least either one of the length and width of the page of the recording medium at a rear stage of the fixing step; and an image information correcting step of determining a quantity of heat shrinkage of the recording medium generated by the heating operation in the fixing step based on outputs generated in the first detecting step and the second detecting step so as to correct the second image information based on the quantity of heat shrinkage.

* * * * *